United States Patent
Lee et al.

(10) Patent No.: US 11,670,751 B2
(45) Date of Patent: Jun. 6, 2023

(54) FLEXIBLE AIR SUPPLY DAMPER SYSTEM FOR PREVENTING OVERDRYING-CAUSED DEFECT OF SECONDARY BATTERY ELECTRODE PLATE

(71) Applicant: SK INNOVATION CO., LTD., Seoul (KR)

(72) Inventors: Sang Hwa Lee, Daejeon (KR); Se Hun Park, Daejeon (KR); Hoe Sun Jeong, Daejeon (KR)

(73) Assignee: SK ON CO., LTD, Seoul (KR)

(*) Notice: Subject to any disclaimer, the term of this patent is extended or adjusted under 35 U.S.C. 154(b) by 68 days.

(21) Appl. No.: 17/234,198

(22) Filed: Apr. 19, 2021

(65) Prior Publication Data
US 2021/0328208 A1 Oct. 21, 2021

(30) Foreign Application Priority Data
Apr. 17, 2020 (KR) .................. 10-2020-0046734

(51) Int. Cl.
*H01M 4/04* (2006.01)
(52) U.S. Cl.
CPC ................. *H01M 4/0471* (2013.01)
(58) Field of Classification Search
CPC .................................................. H01M 4/0471
USPC ........................................................ 34/337
See application file for complete search history.

(56) References Cited

U.S. PATENT DOCUMENTS

| | | | | | |
|---|---|---|---|---|---|
| 2,097,233 | A | * | 10/1937 | Meston | B05B 16/95 204/192.15 |
| 2,231,457 | A | * | 2/1941 | Stephen | H05B 6/50 34/143 |
| 4,438,160 | A | * | 3/1984 | Ishikawa | C03C 17/00 427/282 |
| 7,401,417 | B2 | * | 7/2008 | Rydell | F26B 21/004 34/507 |

(Continued)

FOREIGN PATENT DOCUMENTS

| EP | 3896376 A1 * | 10/2021 | ............ F26B 21/001 |
|---|---|---|---|
| JP | 2022159958 A * | 10/2022 | |

(Continued)

OTHER PUBLICATIONS

Extended European Search Report for European Patent Application No. 21168461.8 issued by the European Patent Office dated Sep. 13, 2021.

*Primary Examiner* — Stephen M Gravini
(74) *Attorney, Agent, or Firm* — IP & T Group LLP

(57) ABSTRACT

Provided is a flexible air supply damper system for preventing an overdrying-caused defect of a secondary battery electrode plate, the flexible air supply damper system including: a fluid supply unit supplying a fluid; a heating unit heating the fluid supplied through the fluid supply unit; a drying unit drying the electrode plate while receiving the fluid heated through the heating unit; a damper unit splitting the fluid passing through the heating unit to control an amount of the fluid to be introduced into the drying unit; and a discharge unit through which the fluid used in the drying unit and the fluid split out of the damper unit are discharged. By controlling the amount of the fluid to be introduced into the drying unit, the electrode plate is prevented from being overdried.

7 Claims, 6 Drawing Sheets

(56) References Cited

U.S. PATENT DOCUMENTS

| | | | | |
|---|---|---|---|---|
| 8,056,252 | B2 * | 11/2011 | Fernandes | F24F 3/153 |
| | | | | 261/153 |
| 9,869,514 | B2 * | 1/2018 | Haarlemmer | F26B 1/00 |
| 10,184,717 | B2 * | 1/2019 | Heo | F26B 21/04 |
| 2021/0328208 | A1* | 10/2021 | Lee | F26B 21/12 |

FOREIGN PATENT DOCUMENTS

| | | | |
|---|---|---|---|
| KR | 10-1264522 B1 | | 5/2013 |
| KR | 10-2013-0127578 A | | 11/2013 |
| KR | 10-1475429 B1 | | 12/2014 |
| KR | 10-2015-0131561 A | | 11/2015 |
| KR | 10-2015-0131563 A | | 11/2015 |
| KR | 10-2017-0109912 A | | 10/2017 |
| KR | 20170109912 A | * | 10/2017 |
| KR | 10-2018-0069388 A | | 6/2018 |
| KR | 10-1867659 B1 | | 6/2018 |
| KR | 20220121504 A | * | 9/2022 |

\* cited by examiner

FLEXIBLE AIR SUPPLY DAMPER SYSTEM FOR PREVENTING OVERDRYING-CAUSED DEFECT OF SECONDARY BATTERY ELECTRODE PLATE

CROSS-REFERENCE TO RELATED APPLICATIONS

This application claims priority under 35 U.S.C. § 119 to Korean Patent Application No. 10-2020-0046734, filed on Apr. 17, 2020, in the Korean Intellectual Property Office, the disclosure of which is incorporated herein by reference in its entirety.

TECHNICAL FIELD

The following disclosure relates to a flexible air supply damper system for preventing an overdrying-caused defect of a secondary battery electrode plate capable of controlling a flow rate of air to be supplied to a drying unit to prevent damage to the electrode plate caused when the electrode plate is overdried at the beginning of the drying process.

BACKGROUND

A device for drying a secondary battery electrode plate has a predetermined drying temperature and air volume for each section of a drying furnace. Since the electrode plate is dried in a state where the temperature and the air volume are kept constant, the electrode plate is overdried due to concentration-based drying at the beginning of the drying process, resulting in a crack in the electrode plate, a break in the electrode plate, and an increase in electrode resistance due to binder migration. This has caused a problem that the quality of the dried electrode plate deteriorates.

Conventionally, in order to prevent such a problem, the following methods have been proposed: when the drying furnace is in operation, a door of the drying furnace is opened to forcibly introduce external fluid into the drying furnace, thereby resolving overheating; production is performed after water is sprayed onto a substrate with a sprayer at the beginning of operating the drying furnace to forcibly increase a solvent saturation amount in the drying furnace; and a temperature in the drying furnace is lowered at the beginning of operating the drying furnace and adjusted to a target drying temperature simultaneously with production. However, the introduction of the external fluid for resolving overheating may cause a safety accident because flammable/toxic gas (NMP) generated during drying a positive electrode plate is released to the outside, the spraying of the water for forcibly increasing the solvent saturation amount in the drying furnace may cause a problem that the positive electrode plate generating NMP during the drying process may have a rapidly increasing NMP gas concentration, and the lowering of the initial temperature and the adjusting of the temperature to the target drying temperature simultaneously with the production may cause a problem that a time required for stabilizing the temperature from the low temperature to the target temperature is not constant, and thus, the electrode plate is not partially dried in the temperature stabilizing process, resulting in a deterioration in production quality.

Therefore, there is a need for a new electrode plate drying system capable of solving such problems.

RELATED ART DOCUMENT

Patent Document

Patent Document 1) Korean Patent Laid-Open Publication No. 10-2018-0069388 (entitled "ELECTRODE DRYING DEVICE" and published on Jun. 25, 2018)

SUMMARY

An embodiment of the present invention is directed to providing a flexible air supply damper system for preventing an overdrying-caused defect of a secondary battery electrode plate capable of controlling an amount of hot air supplied to a drying furnace, when the system is restarted after being stopped, to solve a problem of overheating of the electrode plate at the beginning of the drying process.

Also, a specific aspect of such a system is proposed to maintain the system in a more efficient way.

Another embodiment of the present invention is directed to providing a method for preventing overdrying using the flexible air supply damper system for preventing an overdrying-caused defect of a secondary battery electrode plate.

In one general aspect, a flexible air supply damper system for preventing an overdrying-caused defect of a secondary battery electrode plate includes: a fluid supply unit 100 supplying a fluid; a heating unit 200 heating the fluid supplied through the fluid supply unit 100; a drying unit 300 drying an electrode plate while receiving the fluid heated through the heating unit 200; a damper unit 400 splitting the fluid passing through the heating unit 200 to control an amount of the fluid to be introduced into the drying unit 300; and a discharge unit 500 through which the fluid used in the drying unit 300 and the fluid split out of the damper unit 400 are discharged.

The discharge unit 500 may include a discharge means 510 discharging the fluid, a first discharge passage 520 allowing the damper unit 400 and the discharge means 510 to communicate with each other, and a second discharge passage 530 allowing the drying unit 300 and the discharge means 510 to communicate with each other.

The flexible air supply damper system may further include a circulation unit 600 reintroducing the fluid from the drying unit 300 via the heating unit 200.

The fluid supply unit 100 may include an introduction means 110 introducing the fluid, and an introduction passage 120 guiding the fluid introduced by the introduction means 110 to the heating unit 200.

The circulation unit 600 may include a circulation-supply means 610 positioned between the introduction means 110 and the heating unit 200 and supplying, to the heating unit 200, at least one of the fluid introduced through the introduction means 110 and the fluid introduced through the drying unit 300, and a circulation passage 620 allowing the drying unit 300 and the introduction passage 120 positioned between the introduction means 110 and the circulation-supply means 610 to communicate with each other.

The flexible air supply damper system may further include a flow rate measurement unit 700 positioned on the circulation passage 620 to measure a flow rate of the fluid introduced into the introduction passage 120 through the circulation passage 620 and provide information on the measured flow rate to the discharge means 510.

The discharge means 510 may control an amount of the fluid to be discharged based on the information on the flow rate received from the flow rate measurement unit 700 to keep an amount of the fluid circulating through the circulation passage 620 constant.

In another general aspect, a drying method using the flexible air supply damper system for preventing an overdrying-caused defect of a secondary battery electrode plate includes: an introduction fluid flow rate determination step S100 of determining a flow rate of fluid to be introduced through the fluid supply unit 100; a drying fluid temperature determination step S200 of setting a temperature of the fluid to be introduced into the drying unit 300; a drying fluid flow rate determination step S300 of controlling a flow rate of the fluid to be introduced into the drying unit 300 from the damper unit 400; and a discharge fluid flow rate determination step S400 of determining a flow rate of the fluid to be discharged through the discharge unit 500, wherein in the drying fluid flow rate determination step S300, the flow rate of the drying fluid is determined as increasing in a stepwise manner for a predetermined period of time.

DETAILED DESCRIPTION OF MAIN ELEMENTS

Figure 1:
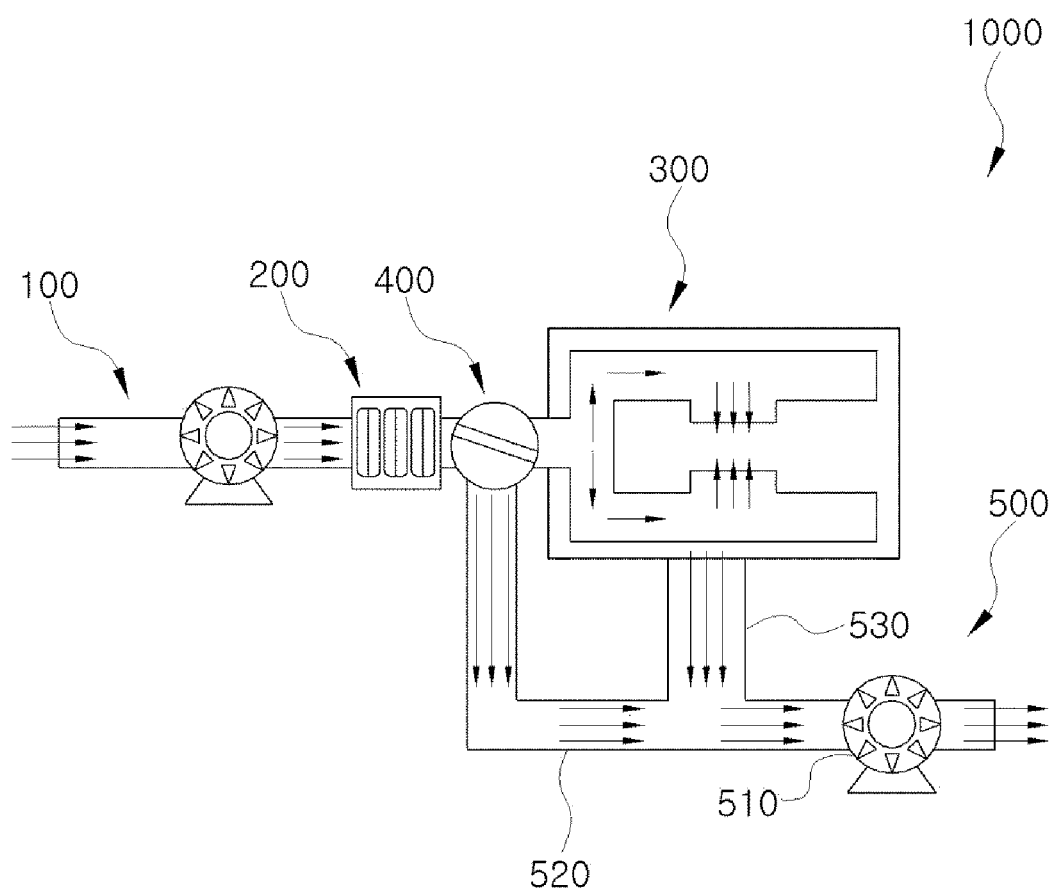
FIG. 1 is a conceptual diagram illustrating a flexible air supply damper system for preventing an overdrying-caused defect of a secondary battery electrode plate according to a first exemplary embodiment of the present invention.

100: Fluid supply unit
110: Introduction means
120: Introduction passage
200: Heating unit
300: Drying unit
400: Damper unit
500: Discharge unit
510: Discharge means
520: First discharge passage
530: Second discharge passage
600: Circulation unit
610: Circulation-supply means
620: Circulation passage
700: Flow rate measurement unit

S100: Introduction fluid flow rate determination step
S200: Drying fluid temperature determination step
S300: Drying fluid flow rate determination step
S400: Discharge fluid flow rate determination step

DETAILED DESCRIPTION OF EMBODIMENTS

The advantages and features of the present invention and methods for accomplishment thereof will be clear from the exemplary embodiments that will be described in detail below with reference to the accompanying drawings. However, the present invention is not limited to the exemplary embodiments to be described below and may be implemented in variously different forms. The exemplary embodiments are provided to complete the disclosure of the present invention and for those skilled in the art to completely understand the scope of the present invention. The present invention is defined only by the claims. Like reference numerals denote like components throughout the specification.

In describing the exemplary embodiments of the present invention, if it is determined that a detailed description of a known function or configuration may unnecessarily obscure the gist of the present invention, the detailed description thereof will be omitted. Further, the following terminologies are defined in consideration of the functions in the exemplary embodiments of the present invention and may be construed in different ways by the intention or practice of users and operators. Accordingly, they should be defined based on the contents throughout the specification.

Hereinafter, a flexible air supply damper system 1000 for preventing an overdrying-caused defect of a secondary battery electrode plate according to the present invention will be described with reference to the accompanying drawings.

FIG. 1 is a conceptual diagram illustrating a flexible air supply damper system 1000 for preventing an overdrying-caused defect of a secondary battery electrode plate according to a first exemplary embodiment of the present invention.

Referring to FIG. 1, the flexible air supply damper system 1000 for preventing an overdrying-caused defect of a secondary battery electrode plate according to the first exemplary embodiment of the present invention includes: a fluid supply unit 100 supplying a fluid; a heating unit 200 heating the fluid supplied through the fluid supply unit 100; a drying unit 300 drying the electrode plate while receiving the fluid heated through the heating unit 200; a damper unit 400 splitting the fluid passing through the heating unit 200 to control an amount of the fluid to be introduced into the drying unit 300; and a discharge unit 500 through which the fluid used in the drying unit 300 and the fluid split out of the damper unit 400 are discharged.

Specifically, when drying the secondary battery electrode plate, a heat-based drying scheme using a temperature and an air volume and a concentration-based drying scheme using a solvent saturation amount are used together. However, there has been a problem that, when the system is restarted after being shut down, since the solvent saturation amount in the drying unit does not reach a predetermined value, the electrode plate is over-dried, resulting in a defect. The present invention is provided to control an amount of the fluid to be introduced into the drying unit 300 using the damper unit 400, thereby preventing the electrode plate from being overdried when the same amount of fluid is introduced into the drying unit in a state where the solvent saturation amount in the drying unit is low.

More specifically, a degree to which the electrode plate is dried is controlled based on the temperature and the amount of the fluid introduced into the drying unit, in which the electrode plate is dried, and the solvent saturation amount in the drying unit. In this case, when the system is restarted, since the solvent saturation amount in the drying unit 300 is low, if the fluid is introduced into the drying unit 300 in an amount that is suitable when the solvent saturation amount is a predetermined value or higher, a concentration-based drying rate may increase and the electrode plate may be overdried. Thus, the amount of the fluid to be introduced into the drying unit 300 is controlled using the damper unit 400.

In addition, the discharge unit 500 includes a discharge means 510 discharging the fluid, a first discharge passage 520 allowing the damper unit 400 and the discharge means 510 to communicate with each other, and a second discharge passage 530 allowing the drying unit 300 and the discharge means 510 to communicate with each other. Specifically, the fluid split out of the damper unit 400 and the fluid discharged after being used in the drying unit 300 are discharged by the discharge means 510 after moving through the first discharge passage 520 and the second discharge passage 530, respectively.

Figure 2:
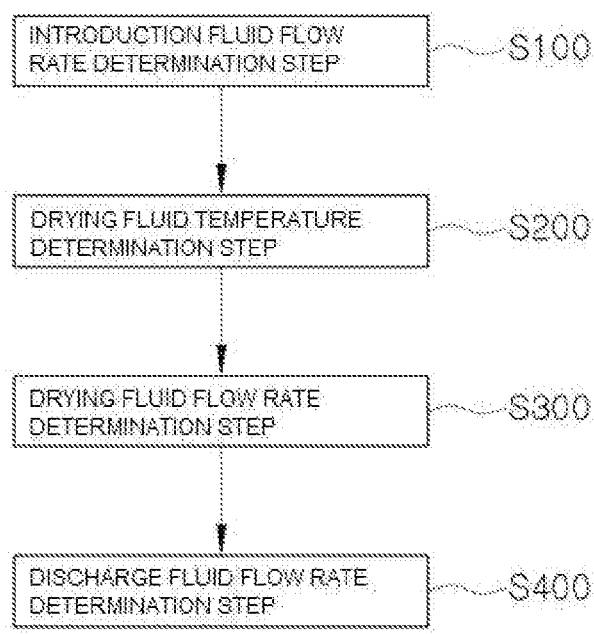
FIG. 2 is a flowchart illustrating a drying method using the flexible air supply damper system for preventing an overdrying-caused defect of a secondary battery electrode plate according to the first exemplary embodiment.

FIG. 2 is a flowchart illustrating a drying method using the flexible air supply damper system 1000 for preventing an overdrying-caused defect of a secondary battery electrode plate according to the first exemplary embodiment, and FIG. 3 illustrates a table and a graph for explaining the electrode plate drying method of FIG. 2.

Referring to FIG. 2, the drying method using the flexible air supply damper system 1000 for preventing an overdrying-caused defect of a secondary battery electrode plate may include: an introduction fluid flow rate determination step S100 of determining a flow rate of the fluid to be introduced through the fluid supply unit 100; a drying fluid temperature determination step S200 of setting a temperature of the fluid to be introduced into the drying unit 300; a drying fluid flow rate determination step S300 of controlling a flow rate of the fluid to be introduced into the drying unit 300 from the damper unit 400; and a discharge fluid flow rate determination step S400 of determining a flow rate of the fluid to be discharged through the discharge unit 500. The flow rate of the drying fluid, which is determined in the drying fluid flow rate determination step S300, may be determined as increasing in a stepwise manner for a predetermined period of time.

Figures 3A, 3B:
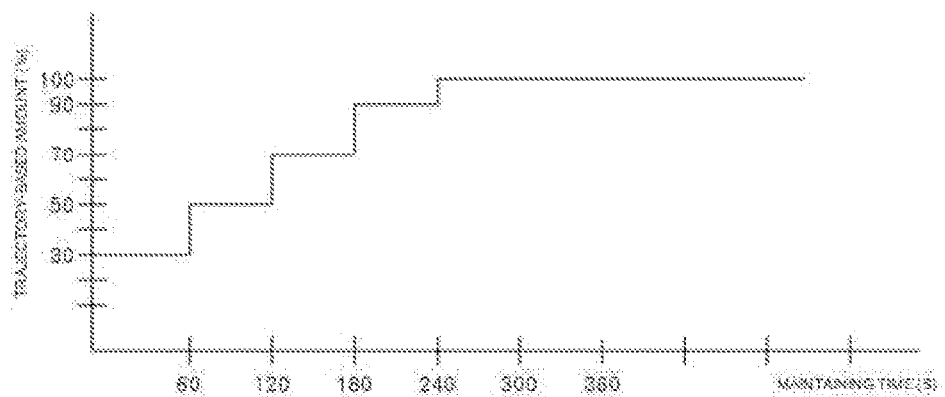
FIGS. 3A and 3B is each a table and a graph for explaining the electrode plate drying method of the flexible air supply damper system for preventing an overdrying-caused defect of a secondary battery electrode plate according to the first exemplary embodiment.

Specifically, as described above, when a large amount of drying fluid is introduced into the drying unit 300 in a state where the solvent saturation amount in the drying unit 300 is low, overdrying may occur. According to the present invention, as illustrated in FIGS. 3A and 3B, when the total amount of the fluid supplied to the heating unit 200 is defined as 100% based on a trajectory-based amount using the damper unit 400, 30% of the total amount of the fluid is supplied to the drying unit 300 for about 60 seconds in step 1, 50% of the total amount of the fluid is supplied to the drying unit 300 for about 60 seconds in step 2, and the amount of the fluid supplied to the drying unit 300 sequentially increases in a stepwise manner in the next steps at time intervals until the final step N in which the solvent saturation amount in the drying unit 300 increases to the predetermined value and all of the fluid heated while passing through the heating unit 200 is supplied to the drying unit 300.

Therefore, since the flow rate of the fluid supplied to the drying unit 300 increases in the stepwise manner at the time intervals, it is possible to solve the overdrying problem that occurs when a large amount of drying fluid is supplied to the drying unit 300 at the beginning of operating the system.

Also, since the amount of the fluid supplied to the heating unit 200 is constant at all times, it is possible to minimize a range of fluctuation in temperature of the fluid supplied to the drying unit 300.

Figure 4:
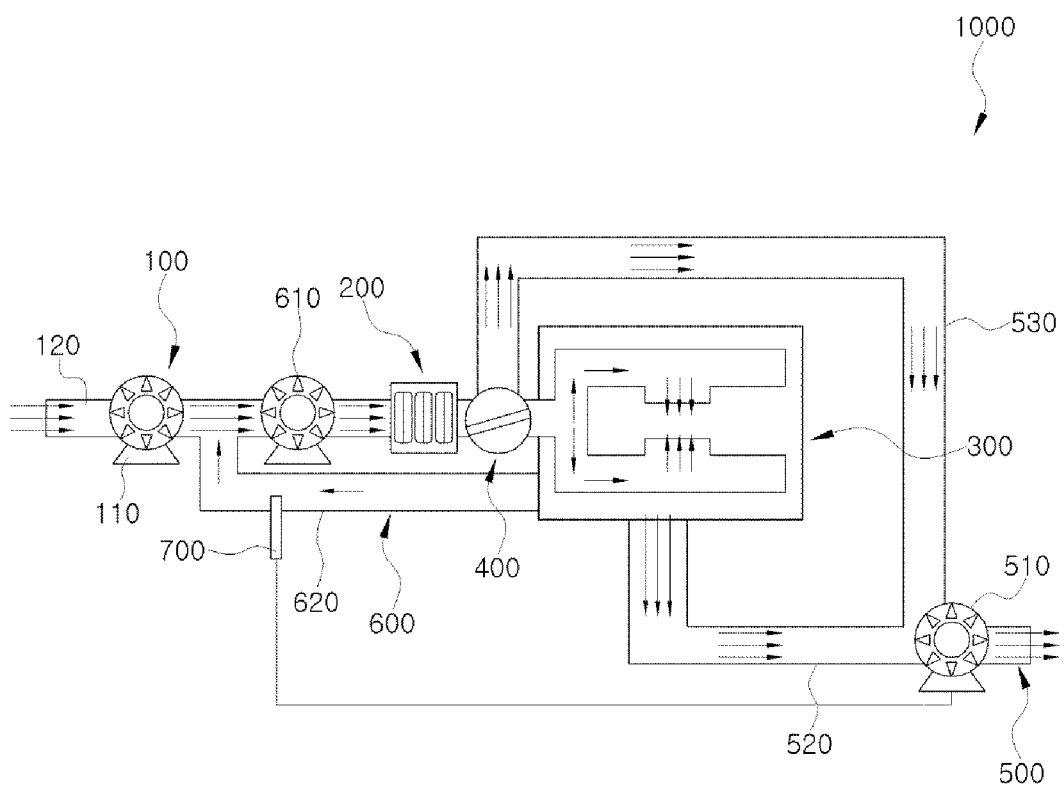
FIGS. 4 and 5 are conceptual diagrams illustrating a flexible air supply damper system for preventing an overdrying-caused defect of a secondary battery electrode plate according to a second exemplary embodiment of the present invention.
Figure 5:
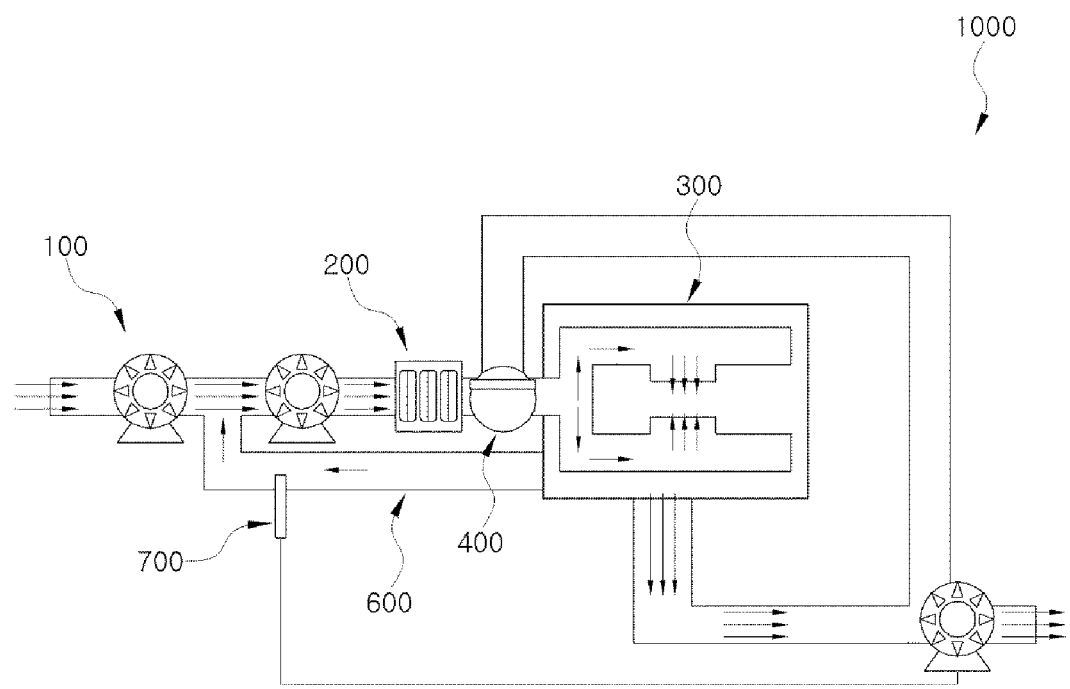

FIGS. 4 and 5 are conceptual diagrams illustrating a flexible air supply damper system 1000 for preventing an overdrying-caused defect of a secondary battery electrode plate according to a second exemplary embodiment of the present invention.

Referring to FIG. 4, the flexible air supply damper system 1000 for preventing an overdrying-caused defect of a secondary battery electrode plate according to the second exemplary embodiment of the present invention further includes a circulation unit 600 reintroducing the fluid from the drying unit 300 via the heating unit 200. Specifically, the electrode plate positioned in the drying unit 300 is dried by the fluid heated in the heating unit 200. In this regard, there has been a problem in that, in order to keep the flow rate and temperature of the fluid introduced into the drying unit 300 constant, a lot of energy is consumed because fresh air introduced through the fluid supply unit 100 needs to be heated all over again. In addition, there has been another problem in that, when new air is supplied to the heating unit 200 through the fluid supply unit 100, a range of fluctuation in solvent saturation amount in the heating unit 200 increases. According to the present invention, the circulation unit 600 is used to mix the air from the drying unit 300 with the air newly introduced through the fluid supply unit 100.

When the air from the drying unit 300 is mixed in the fluid supply unit 100, a flow rate of the circulating fluid is added to that of the fluid introduced through the fluid supply unit 100, thereby reducing energy consumption in the fluid supplying process.

Further, referring to FIG. 4, the fluid supply unit 100 includes an introduction means 110 introducing the fluid, and an introduction passage 120 guiding the fluid introduced by the introduction means 110 to the heating unit 200, and the circulation unit 600 includes a circulation-supply means 610 positioned between the introduction means 110 and the heating unit 200 and supplying, to the heating unit 200, at least one of the fluid introduced through the introduction means 110 and the fluid introduced through the drying unit 300, and a circulation passage 620 allowing the drying unit 300 and the introduction passage 120 positioned between the introduction means 110 and the circulation-supply means 610 to communicate with each other.

Specifically, allowing the drying unit 300 and the introduction passage 120 to communicate with each other through the circulation passage 620, the circulation unit 600 forms a path through which the fluid from the drying unit 300 may circulate, and supplies, to the drying unit 300, the fluid in which the fluid from the drying unit sucked by the circulation-supply means 610 is mixed with the fluid introduced through the introduction means 110.

In addition, referring to FIG. 4, the flexible air supply damper system for preventing an overdrying-caused defect of a secondary battery electrode plate according to the present invention further includes a flow rate measurement unit 700 positioned on the circulation passage 620 to measure a flow rate of the fluid introduced into the introduction passage 120 through the circulation passage 620 and provide information on the measured flow rate to the discharge means 510. The discharge means 510 may control an amount of fluid to be discharged based on the information on the flow rate received from the flow rate measurement unit 700 to keep an amount of fluid circulating through the circulation passage 620 constant.

Specifically, in order to stably dry the electrode plate, it is important to control a flow rate of fluid to be supplied to be kept constant. Thus, according to the present invention, the flow rate measurement unit 700 is positioned to detect an amount of the circulating fluid on the circulation passage 620, and information on the flow rate measured by the flow rate measurement unit 700 is provided to the discharge means 510 capable of controlling an amount of the circulating fluid, such that the discharge means 510 may control an amount of fluid to be discharged based on the received information to control an amount of fluid to be supplied to the circulation-supply means 610 through the circulation passage 620.

In this case, the circulation-supply means 610 may be any type of device capable of controlling an amount of fluid to be discharged, and may be a fan whose blades rotate to move the fluid as an example. In addition, the introduction means 110 and the discharge means 510 may be the same device. In the present invention, the fluid refers to any type of fluid that can be used for drying, and may be air as an example.

FIG. 6 is a table and a graph for explaining the electrode plate drying method of the flexible air supply damper system 1000 for preventing an overdrying-caused defect of a secondary battery electrode plate according to the second exemplary embodiment of the present invention.

Figures 6A, 6B:
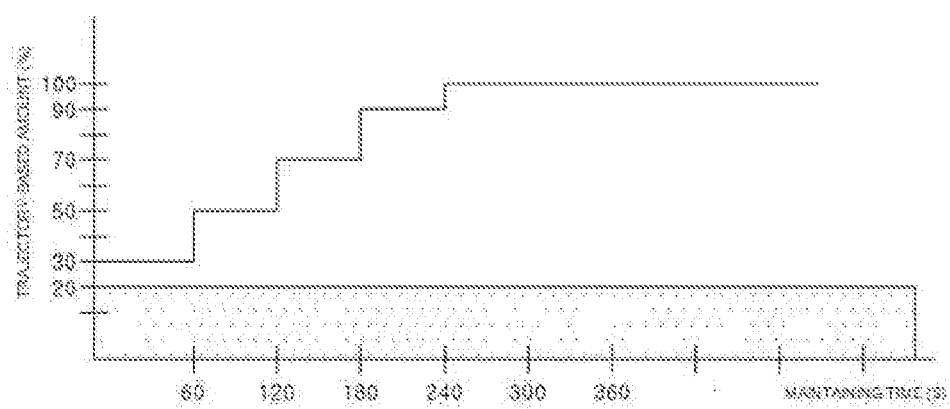
FIGS. 6A and 6B is each a table and a graph for explaining the electrode plate drying method of the flexible air supply damper system for preventing an overdrying-caused defect of a secondary battery electrode plate according to the second exemplary embodiment of the present invention.

Referring to FIGS. 4 and 5, when the damper unit 400 splits the introduced fluid to control a flow rate of the fluid to be introduced into the drying unit 300, only some of the fluid introduced into the heating unit 200 is introduced into the drying unit 300 if the damper unit 400 is partially opened as illustrated in FIG. 4, or all of the fluid introduced into the heating unit 200 is introduced into the drying unit 300 if the damper unit 400 is fully opened as illustrated in FIG. 5. Accordingly, the present invention is capable of solving the electrode plate overdrying problem at the beginning of the drying process by increasing a degree to which the damper unit 400 is opened in a stepwise manner, as illustrated in FIGS. 6A and 6B, in a state where the amount of the circulating fluid is kept constant.

In the drawings, it is illustrated that a trajectory-based amount maintaining time is set to 60 seconds, but this is an example. When the fluid from the drying unit 300 circulates through the circulation unit 600, the solvent saturation amount in the drying unit 300 is stabilized faster, and the temperature of the fluid can be more stably controlled resulting from a reduced difference between a temperature of the fluid before being heated and a target temperature which the fluid needs to reach after passing through the heating unit 200. This also makes it possible to reduce the trajectory-based amount maintaining time as compared with that when the circulation unit 600 is not provided.

The flexible air supply damper system for preventing an overdrying-caused defect of a secondary battery electrode plate according to the present invention is advantageous in that an amount of hot air introduced into the drying unit can be controlled using the damper unit, thereby solving the overdrying problem that occurs when the drying device is restarted after being stopped.

Further, the flexible air supply damper system for preventing an overdrying-caused defect of a secondary battery electrode plate according to the present invention is also advantageous in that the damper unit controlling an amount of fluid to be introduced into the drying unit is positioned between the heating unit adjusting a temperature of the fluid and the drying unit drying the electrode plate using the heated fluid, thereby keeping the amount of fluid to be supplied to the heating unit constant.

Specifically, if the amount of the fluid introduced into the heating unit fluctuates, the temperature of the fluid having passed through the heating unit cannot be kept constant. Thus, the damper unit controlling a flow rate of the fluid is positioned at a rear end of the heating unit to keep the temperature of the fluid to be introduced into the drying unit constant at all times.

Further, the flexible air supply damper system for preventing an overdrying-caused defect of a secondary battery electrode plate according to the present invention is also advantageous in that the fluid used for drying can be circulated for reuse, thereby quickly increasing an initial solvent saturation amount in the drying unit to a predetermined value and minimizing energy consumption in heating the fluid.

In addition, the flexible air supply damper system for preventing an overdrying-caused defect of a secondary battery electrode plate according to the present invention is also advantageous in that the discharge means and the flow rate measurement unit communicate with each other to control an amount of circulating fluid to be constant, thereby keeping a flow rate of fluid to be introduced into the drying unit constant.

The present invention is not limited to the above-described exemplary embodiments, and may be applied in various ways. Various modifications can be made by any person having ordinary knowledge in the field to which the present invention pertains without departing from the gist of the present invention claimed in the appended claims.

What is claimed is:

1. A flexible air supply damper system comprising:
a fluid supply unit supplying a fluid;
a heating unit heating the fluid supplied through the fluid supply unit;
a drying unit drying an electrode plate while receiving the fluid heated through the heating unit;
a damper unit splitting the fluid passing through the heating unit to control an amount of the fluid to be introduced into the drying unit; and
a discharge unit through which the fluid used in the drying unit and the fluid split out of the damper unit are discharged.

2. The flexible air supply damper system of claim 1, wherein the discharge unit includes a discharge means discharging the fluid, a first discharge passage allowing the damper unit and the discharge means to communicate with each other, and a second discharge passage allowing the drying unit and the discharge means to communicate with each other.

3. The flexible air supply damper system of claim 1, further comprising a circulation unit reintroducing the fluid from the drying unit via the heating unit.

4. The flexible air supply damper system of claim 3, wherein the fluid supply unit includes an introduction means introducing the fluid, and an introduction passage guiding the fluid introduced by the introduction means to the heating unit.

5. The flexible air supply damper system of claim 4, wherein the circulation unit includes a circulation-supply means positioned between the introduction means and the heating unit and supplying, to the heating unit, at least one of the fluid introduced through the introduction means and the fluid introduced through the drying unit, and a circulation passage allowing the drying unit and the introduction passage positioned between the introduction means and the circulation-supply means to communicate with each other.

6. The flexible air supply damper system of claim 5, further comprising a flow rate measurement unit positioned on the circulation passage to measure a flow rate of the fluid introduced into the introduction passage through the circulation passage and provide information on the measured flow rate to the discharge means.

7. The flexible air supply damper system of claim 6, wherein the discharge means controls an amount of the fluid to be discharged based on the information on the flow rate received from the flow rate measurement unit to keep an amount of the fluid circulating through the circulation passage constant.

* * * * *